Patented May 21, 1929.

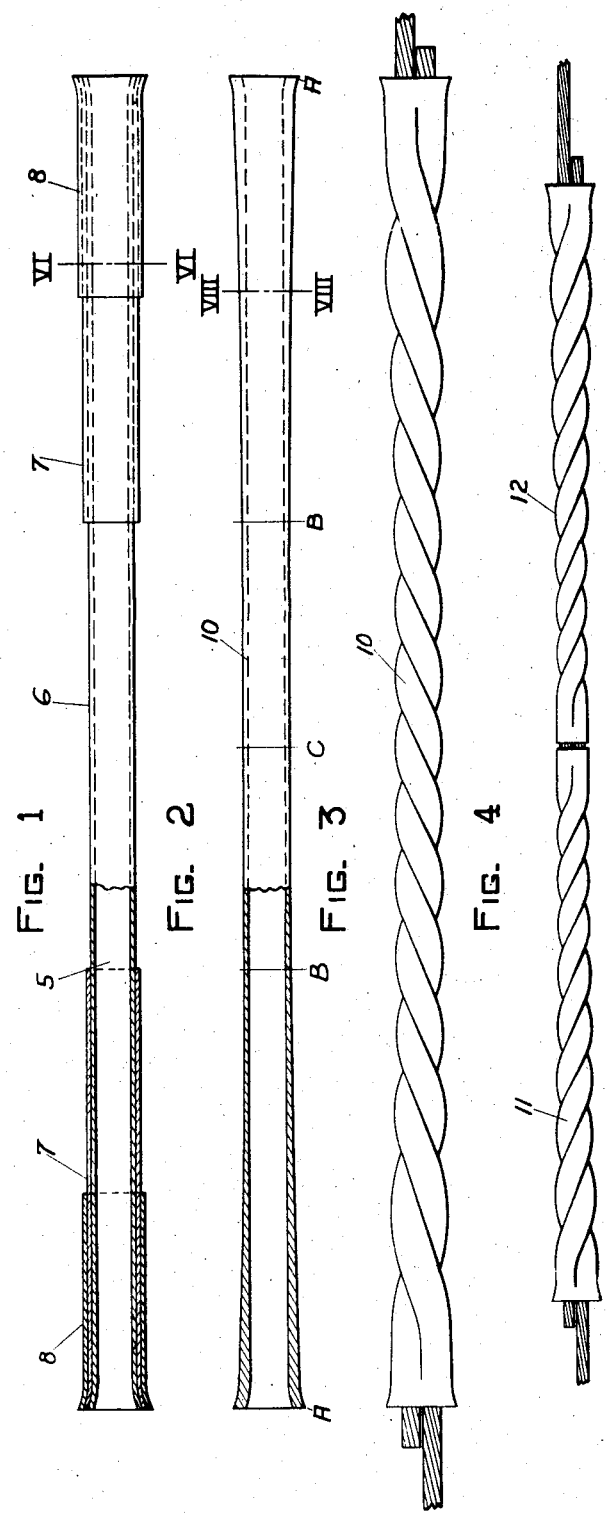

1,714,253

UNITED STATES PATENT OFFICE.

THEODORE VARNEY, OF SEWICKLEY, PENNSYLVANIA, ASSIGNOR TO ALUMINUM COMPANY OF AMERICA, OF PITTSBURGH, PENNSYLVANIA, A CORPORATION OF PENNSYLVANIA.

JOINT FOR WIRES OR CABLES.

Application filed November 16, 1922. Serial No. 601,384.

This invention is for a joint for connecting the ends of wires or cables and for a method of producing the same.

For a good many years, the ends of wires or cables have been joined by passing the ends of the cables through a flattened or double-barreled tube, from opposite ends of said tube, which tube is then twisted. The tube is sometimes made in the necessary length to form the joint; other times, two tubes of equal length are used, the advantage of two tubes residing in the greater ease with which the cables can be passed through the tubes.

The common method of twisting the tubes to form the joint is to apply a suitable wrench, designed for this purpose, to opposite ends of the tube and then turn the wrench until the tube is twisted throughout substantially its entire length. Ordinarily, this will put a uniform pitch to the twists throughout the length of the tube.

It has been found from experience that the joint will develop more strength in the cable if it can be so twisted that the pitch of the twists will be shorter near the middle of the tube than at the ends. The reason for this is that, at the outer end of the tube, where the maximum tension occurs in the cable, the clamping power of the tube should be less than near the middle of the tube, where the tension is less. This is in accordance with the well established physical fact that a clamp which holds a wire will develop a higher strength in that wire if the pressure is gradually increased from the end of the clamp toward the middle, or from the end of the clamp where the cable is under maximum tension to the point in the clamp where the cable is under minimum tension.

By means of several applications of the wrench to different points in the tube, a graduated pitch in the twists can be obtained. In practice, however, this is an inconvenient and difficult thing to do, and requires some considerable time.

The present invention proposes to utilize in a joint of this kind, a tube so designed that when the wrenches are applied to the ends thereof and the tube twisted, it will have the inherent property of twisting, in such manner that the pitch of the twist will vary at different points in the tube, being shortest where it is desired to develop the greatest pressure. This is preferably done by making the walls of the tube thicker at some points than at others.

The invention may be readily understood by reference to the accompanying drawings, in which:

Fig. 1 is a view, partly in section and partly in elevation, of a composite tube built up of telescoping sections in such manner that the walls are thickest at the points where the pitch of the twists is to be greatest;

Fig. 2 is a similar view of an integral tube having the walls thereof tapering in thickness in a similar manner;

Fig. 3 is a side view of a completed joint formed with a tube of the character shown in Figs. 1 and 2;

Fig. 4 is a view similar to Fig. 3 of a completed joint formed of two short lengths of tube instead of one long one;

Fig. 5 is an end view of the tube shown in Fig. 1;

Fig. 6 is a transverse section in the plane of line VI—VI of Fig. 1;

Fig. 7 is an end view of Fig. 2; and

Fig. 8 is a transverse section in the plane of line VIII—VIII of Fig. 2.

Referring to Fig. 1 of the drawings, 5 designates the tube for the joint structure, which tube is composite, comprising a main flat sided inner tube 6 having telescoped over the ends thereof and extending two-thirds of the distance toward the center of the tube, intermediate tube sections 7. Telescoped over the sections 7 and extending inwardly from the end thereof, one-half of the length of the intermediate tube, which is one-third of the distance to the center of the tube 6, is an outer tube 8. Thus, the tube structure 5 has a single thickness of metal therein for a distance of one-third of the length from the center toward the ends. Beyond this distance, for another third, there is a double thickness of metal, while the last third of the distance from each side of the center has three thicknesses of metal. In practice, it might be found desirable to have tubes 7 and 8 of different thicknesses than the walls of the tube 6, and the length of the different telescoping sections might be varied as well as the number of them.

In Fig. 2, the tube 10 is integral, but the thickness of the metal in the walls is increased at the desired points in the necessary manner. In this figure, the letter C designates the center of the tube. From C to B, there is preferably no substantial increase in the thickness of the walls. From B to the ends at A, the walls increase in thickness still more. The points where the walls begin to increase in thickness and the amount of increase is determined from approximation and may be varied according to the needs of the joints to be made.

In use, a tube of the kind shown in Figs. 1 or 2 is slipped over one of the cable ends to be joined and the other cable end is then passed through the tube, so that the cable ends overlap throughout the entire length of the tube. Tools of a known construction specially designed for the purpose are then applied to each end of the tube and twisted in opposite directions. The tube will begin to bend at its central portion, being weakest there. Then, as the tool is twisted more, the more resistant intermediate and end portions will twist. Usually, between eight and nine complete twists are sufficient. By reason of the graduated thickness of the walls of the tube, the pitch of the twists will be less at the center of the tube than near the ends, that is, the spirals will be closest together at the center part of the tube.

Using this method, the graduated pitch of the spirals can be obtained as easily as the uniform pitch in the old construction and without any special manipulation of the twisting tools.

As it is often desirable to use two short tubes in place of one long one in order to facilitate the passing of the cable ends therethrough, accordingly, two short sections of tube, as 11 and 12 in Fig. 4, may be used. These sections are similarly formed, the metal in the walls of the tubes being thickest at their outer ends, the thin ends of the tubes being turned toward each other.

With this arrangement, the twisting tools are clamped at opposite ends of each of the sections and twisted. By reason of the metal in the walls of the tube sections being most resistant toward the outer ends thereof, the greatest number of twists per unit of length will exist nearest the inner ends of the tubes, a graduated pitch for the twists thus being given.

Obviously, a joint could also be made using two tube members of the kind shown in Figs. 1 and 2, end to end, and various changes may be made in the construction and application of the tube within the contemplation of my invention.

I claim as my invention:

1. A metallic tubular coupling member for cable ends and the like comprising a plurality of telescoped members assembled to form a tube having the metal thereof of decreasing thickness from its ends towards its middle, whereby upon twisting the tube from the said ends the pitch of the twists thereof will be less at its middle portion than at its ends.

2. A coupling for cable ends and the like comprising a pliable tubular metallic structure having its interior cross sectional area substantially the same substantially throughout its length, a central portion having a minimum substantially uniform thickness, and portions of greater thickness than the central portion, said thickened portions being of gradually decreasing thickness substantially throughout their lengths and extending from the ends thereof to the central portion, whereby upon twisting the tube from its ends the pitch of the twists thereof will be less at its middle portion than the pitch of the twists of the decreasing thickened portions.

3. A coupling for cable ends and the like comprising a pliable tubular metallic member of non-circular cross section, said member having its interior cross sectional area substantially the same substantially throughout its length, a central portion having a minimum substantially uniform thickness, and portions of greater thickness than the central portion, said thickened portions being of gradually decreasing thickness substantially throughout their lengths and extending from the ends thereof to the central portion, whereby upon twisting the tube from its ends the pitch of the twists thereof will be less at its middle portion than the pitch of the twists of the decreasing thickened portions.

In testimony whereof I affix my signature.

THEODORE VARNEY.